(12) United States Patent
Schoeny et al.

(10) Patent No.: US 10,649,473 B2
(45) Date of Patent: May 12, 2020

(54) PRE-METERING SYSTEM FOR FEEDING DIFFERENT TYPES OF SEED INTO A SEED METER

(71) Applicant: CNH Industrial America LLC, New Holland, PA (US)

(72) Inventors: Christopher Schoeny, Yorkville, IL (US); Chad M. Johnson, Arlington Heights, IL (US); Jason T. Czapka, Munster, IN (US); Darian E. Landolt, Evanston, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/376,213

(22) Filed: Apr. 5, 2019

(65) Prior Publication Data

US 2019/0235534 A1 Aug. 1, 2019

Related U.S. Application Data

(62) Division of application No. 15/453,063, filed on Mar. 8, 2017, now Pat. No. 10,296,017.

(51) Int. Cl.
*G05D 9/12* (2006.01)
*A01C 7/12* (2006.01)
*A01C 21/00* (2006.01)

(52) U.S. Cl.
CPC .............. *G05D 9/12* (2013.01); *A01C 7/125* (2013.01); *A01C 7/126* (2013.01); *A01C 21/005* (2013.01); *A01C 7/12* (2013.01); *A01C 7/127* (2013.01)

(58) Field of Classification Search
CPC . G05D 9/12; G05D 9/00; A01C 7/125; A01C 7/123; A01C 7/12; A01C 7/08; A01C 7/00; A01C 7/126; A01C 21/005; A01C 21/00; A01C 7/127
See application file for complete search history.

(56) References Cited

U.S. PATENT DOCUMENTS

| | | | |
|---|---|---|---|
| 4,159,064 | A | 6/1979 | Hood |
| 5,161,473 | A | 11/1992 | Landphair et al. |
| 5,379,706 | A | 1/1995 | Gage et al. |
| 5,402,741 | A | 4/1995 | Truax et al. |
| 5,915,312 | A | 6/1999 | Meyer et al. |
| 5,915,313 | A | 6/1999 | Bender et al. |
| 6,748,885 | B2 | 6/2004 | Sauder et al. |
| 6,845,724 | B2 | 1/2005 | Mayerle et al. |
| 8,543,238 | B2 | 9/2013 | Straeter |
| 8,733,257 | B2 | 5/2014 | Beaujot et al. |
| 9,179,594 | B2 | 11/2015 | Graham |
| 2015/0059627 | A1 | 3/2015 | Kinzenbaw et al. |
| 2015/0223390 | A1 | 8/2015 | Wendte et al. |
| 2015/0319916 | A1 | 11/2015 | Garner et al. |

(Continued)

*Primary Examiner* — Christopher J. Novosad
(74) *Attorney, Agent, or Firm* — Rebecca L. Henkel; Rickard K. DeMille

(57) ABSTRACT

A pre-metering system for feeding different types of seed into a seed meter of a planter includes separate feeder wheels that are selectively rotated to deliver different types of seed from on-row storage into the seed meter at a given time. The feeder wheels may be supported by a feeder wheel carrier that may also support various wall and ramped structures, such as upright divider walls and sloped walls that maintain separation between the different types of seeds in the on-row storage and direct the different types of seed toward the individual feeder wheels.

9 Claims, 10 Drawing Sheets

(56) References Cited

U.S. PATENT DOCUMENTS

2015/0351315 A1   12/2015  Wendte et al.
2016/0037713 A1    2/2016  Wendte et al.
2016/0143212 A1    5/2016  Wendte et al.

PRE-METERING SYSTEM FOR FEEDING DIFFERENT TYPES OF SEED INTO A SEED METER

CROSS REFERENCE TO RELATED APPLICATIONS

This application is a divisional non-provisional utility patent application based upon U.S. non-provisional utility patent application Ser. No. 15/453,063, entitled "PRE-METERING SYSTEM FOR FEEDING DIFFERENT TYPES OF SEED INTO A SEED METER," filed Mar. 8, 2017, which is hereby incorporated by reference herein in its entirety.

FIELD OF THE INVENTION

The invention relates generally to planters and, in particular, to planters for planting multiple types or varieties of seed and a system for feeding different types of seed into the seed meter, such as a pre-metering system.

BACKGROUND OF THE INVENTION

Modern farming practices strive to increase yields of agricultural fields. Technological advances of planters allow for better agronomic characteristics at the time of planting, such as providing more accurate seed depth, improved uniformity of seed depth across the planter, and improved accuracy of in-row seed spacing. To reduce operating expenses, farm equipment is operated at relatively faster travel speeds, which reduce the amount of operating time to complete certain tasks. When operating equipment at faster travel speeds, it can be important to maintain the quality of operation and good agronomic characteristics that can be achieved while operating at relatively slower operating speeds. This can be especially difficult to accomplish during planting, which requires precise seed depth placement and spacing accuracy in order to maintain a good seed environment. Furthermore, a single field can have yield performance inconsistencies between different areas of the field. That is because a field can have a wide variety of soil types and management types or zones, such as irrigated and non-irrigated zones in different areas. Seed companies are developing multiple varieties of each of their seed product types to optimize yield in these different areas. The different seed varieties offer improved performance characteristics for different types of soil and management practices. Efforts have been made to plant multiple varieties of a particular seed product type in different areas of fields with different soil types or management zones. These efforts include planters that have different bulk fill hoppers and require the reservoir for each seed meter to be completely cleaned out or planted out before a different seed variety can be delivered to the seed meters. Some planters allow for planting two varieties and include ancillary row units or two separate and distinct seed meters at every row unit. Other planters allow for planting multiple varieties by feeding seeds of different types to seed meters at different times.

SUMMARY OF THE INVENTION

The present invention is directed to systems for row crop planting that allow for planting multiple types of seed in the same field without stopping operation of the planter by way of a system for feeding different types of seed into seed meters. This may be done by way of a pre-metering system, such as an on-row selective seed meter feeding arrangement that can selectively feed different types of seed into the seed meter at each row unit.

According to one aspect of the invention, multiple type or multiple variety planting is accomplished with an on-row pre-metering system that selectively rotates feeder wheels to deliver a particular type of seed to a seed meter as a function of, for example, position in a field, seed type, planting rate, and ground speed. The pre-metering system rotates the feeder wheels to deliver seeds to the seed meter, which may include doing so in discrete seed-charging events for feeding the seed meter. Decisions on which type of seeds to provide in the next seed charging event may be made based on distance or time to reaching a different zone within the field. When the type of seed to be planted will be switched, the pre-metering system may stop feeding the current seed type to the meter and monitor the level of seed within the meter. When the seed level is sufficiently low, the pre-metering system may start rotation of a different feeder wheel to feed the next seed type to the meter to reduce change over time and volume of mixed seed presented to the seed disk.

According to another aspect of the invention, a pre-metering system for feeding different types of seed into a seed meter at a row-unit of a planter for planting an agricultural field is provided. The pre-metering system may include a feeder wheel carrier arranged between multiple compartments of an on-row seed storage system that separately stores multiple types of seed and a seed meter. Multiple feeder wheels may be supported by the feeder wheel carrier. Each of the multiple feeder wheels may be arranged to receive seed from a respective one of the multiple compartments and selectively deliver the seed toward the seed meter.

According to another aspect of the invention, at least one seed sensor may be arranged at the seed meter for detecting a low level seed condition within the seed meter. The multiple feeder wheels may be selectively rotated to feed one of the multiple types of seed to the seed meter based on the detected low-level seed condition within the seed meter. The feeder wheel(s) may be rotated based on a determination of an approaching zone change in which a different type of seed should be planted. The approaching zone change can be identified based on criteria such as planting rate value(s) for a particular seed type, ground speed value(s), heading, and approximate distance or time until reaching the next zone in the field. Determining the approaching zone change may include an evaluation of a planting rate value, a ground speed value, and a position of the planter and/or tractor in the agricultural field. Determining the approaching zone change may also include an evaluation of a distance to an approaching zone that is different than a currently planted zone and a planting density value. This allows a comparison of, for example, how many feet between a current position and the next zone with a seeds/acre and/or seeds/feet value(s) as the planting density value to predict a zone changeover event.

According to another aspect of the invention, the feeder wheel carrier may include a main carrier body with interconnected walls that extend around a carrier cavity. The feeder wheels may be arranged within the carrier cavity. The carrier cavity may define multiple carrier cavity segments that are separated from each other and the feeder wheels may be arranged in the multiple carrier cavity segments.

According to another aspect of the invention, the compartments of the on-row storage system may include compartment outlets with sloped surfaces that slope toward the feeder wheel carrier to funnel the seed toward the feeder wheels. The sloped surfaces at each compartment outlet may be defined by front and back ramped arrangements that each slope downwardly toward the respective feeder wheel. The front and back ramped arrangements may be spaced from each other to define a slot that overlies the respective feeder wheel.

According to another aspect of the invention, an insert is housed within an on-row hopper. The insert defines the feeder wheel carrier and provides at least one divider wall that extends upwardly from the feeder wheel carrier to separate the compartments of the on-row hopper.

According to another aspect of the invention, a multi-variety planter is provided. The planter includes a frame that supports multiple row units. An on-row seed storage system includes multiple compartments arranged at each row units for separately storing seeds of multiple types. A seed meter is arranged at each row unit and is configured to singulate seeds for delivery onto the agricultural field. The seed meter has a housing with a seed inlet for directing seeds into the seed meter. A pre-metering system is arranged at each row unit for feeding different types of seed into the seed meter at different times. The pre-metering system may include a feeder wheel carrier arranged between the compartments and the seed inlet of the seed meter housing. Multiple feeder wheels may be supported by the feeder wheel carrier. Each feeder wheel is arranged to receive seed from a respective one of the compartments and selectively deliver the seed toward the seed inlet of the seed meter housing.

According to another aspect of the invention, a bulk seed storage system stores seeds and at least one of the compartments of the on-row seed storage system receives seeds from the bulk seed storage system. The bulk seed storage system may include multiple bulk storage compartments that hold multiple types of seed that are delivered to the compartments of the on-row seed storage system. At least one of the compartments of the on-row seed storage system may be configured as a manual-fill bulk storage compartment that does not receive seeds from the bulk seed storage system. The on-row seed storage system may include a mini-hopper and the multiple compartments are defined within an upper portion of the mini-hopper. The mini-hopper may include a hopper outlet defined within a lower portion of the mini-hopper and the feeder wheel carrier may be arranged at an intermediate portion of the mini-hopper, between the compartments in the upper portion of the mini-hopper and the hopper outlet in the lower portion of the mini-hopper.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
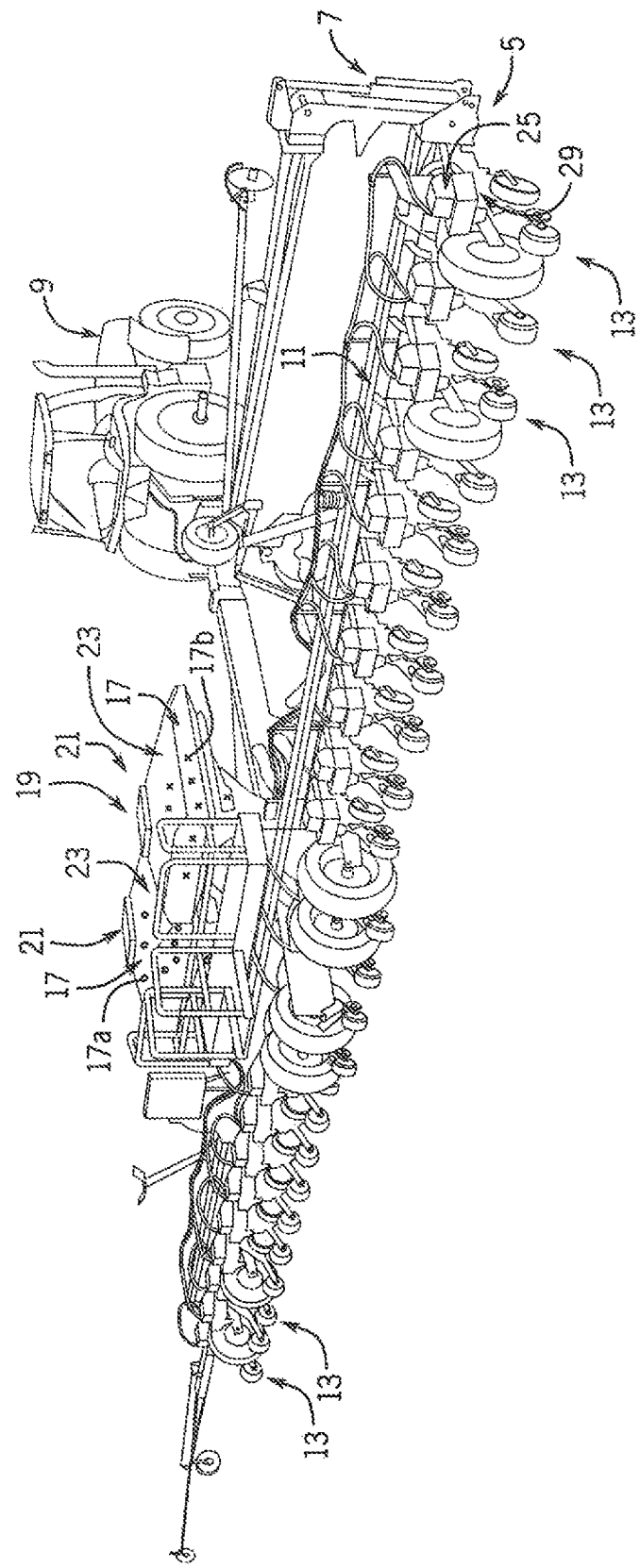
FIG. 1 is a simplified schematic representation of a planter with a pre-metering system for feeding different types of seed into seed meters.

Referring now to the drawings and specifically to FIG. 1, a multi-variety planting system is shown as planting system 5 for planting multiple types or varieties of seed by feeding different types of seed into the seed meter at different times from on-row storage, as explained in greater detail elsewhere herein.

System 5 includes an agricultural implement, shown here as planter 7, which may be one of the EARLY RISER® series planters available from Case IH and is typically pulled by a traction device such as a tractor 9. A frame 11 of the planter 7 supports multiple row units 13 that are substantially identical. Each row unit 13 includes various support, metering, and ground-engaging components. These may include a sub-frame that is connected to the frame 11 of the planter 7 by way of a parallel linkage system and furrow opening and closing mechanisms toward front and back ends of the row unit 13. The opening and closing mechanisms may include opener disks and closing disks, respectively, or other ground-engaging tools for opening and closing a furrow. Each row unit 13 may include a gauge wheel configured for adjusting furrow depth by limiting soil penetration of the furrow-opening mechanism while creating the furrow, and a press wheel may be arranged to roll over the closed furrow and to further firm the soil over the seed to promote favorable seed-to-soil contact.

Still referring to FIG. 1, seed 17 is held in a seed storage system shown here as a bulk seed storage system represented as bulk storage system 19. Bulk storage system 19 is shown here as a central bulk storage system with at least one bulk fill hopper 21, shown here as having two central bulk fill hoppers 21 supported by the frame 11 of the planter 7, remote from the row units 13. The bulk storage system 19 has two compartments shown as bulk storage compartments 23 with one shown in each of the bulk fill hoppers 21. It is understood that the bulk or other storage system may have more than two compartments 23, which may correspond to the number of types of seeds being used for multiple type or variety planting. Additional bulk storage compartments 23 may be provided in each of the bulk fill hoppers 21 by divider walls or partitions. It is understood that the bulk storage system 19 can be configured with at least some on-row bulk storage, with at least some bulk storage at the row units 13 themselves, such as by way of manual-fill on-row bulk storage compartments. The different compartments 23 may hold seeds 17 of a different plant type or a common plant type but different varieties or types 17a, 17b, for planting in different multiple type or variety zones of an agricultural field defined at least in part by characteristics relating to at least one of soil type and management type, or other characteristics such as low/high ground areas, weed issues, insect issues, fungal issues, buffer zones in organic fields that are planted next to non-organic fields, or others, such as those represented as zones VZ1 and VZ2 in the prescription map PM of FIG. 10. Although two different seed varieties or types 17a, 17b are shown, it is understood that other numbers of seed varieties may be stored on and planted by the planter 7 based on, for example, the number of compartments 23 in the bulk storage system 19 for a particular planter 7. Although the seed 17 may be described elsewhere herein as different types 17a, 17b, it is understood that the description of the different types of seed includes different hybrids or varieties. In other words, the different types 17a, 17b of seed 17 include not only different hybrids or varieties of the same plant species, but also different seed products. Different seed products can include seeds of different species, coated and uncoated seeds, such as insecticide coated and non-insecticide-coated seeds. The different seed products can also include refuge in a bag seed and non-refuge in a bag seed, plant-parasite resistant seed and non-plant-parasite-resistant seed such as cyst nematodes resistant seeds and non-cyst nematodes resistant seeds, herbicide-tolerant seed and non-herbicide-tolerant seed, or other different products. The different seed products can further include different crop seeds such as corn and soybeans, oats and barley, different cover crops such as tillage radishes and rye, or various combinations of these or other combinations.

Figure 2:
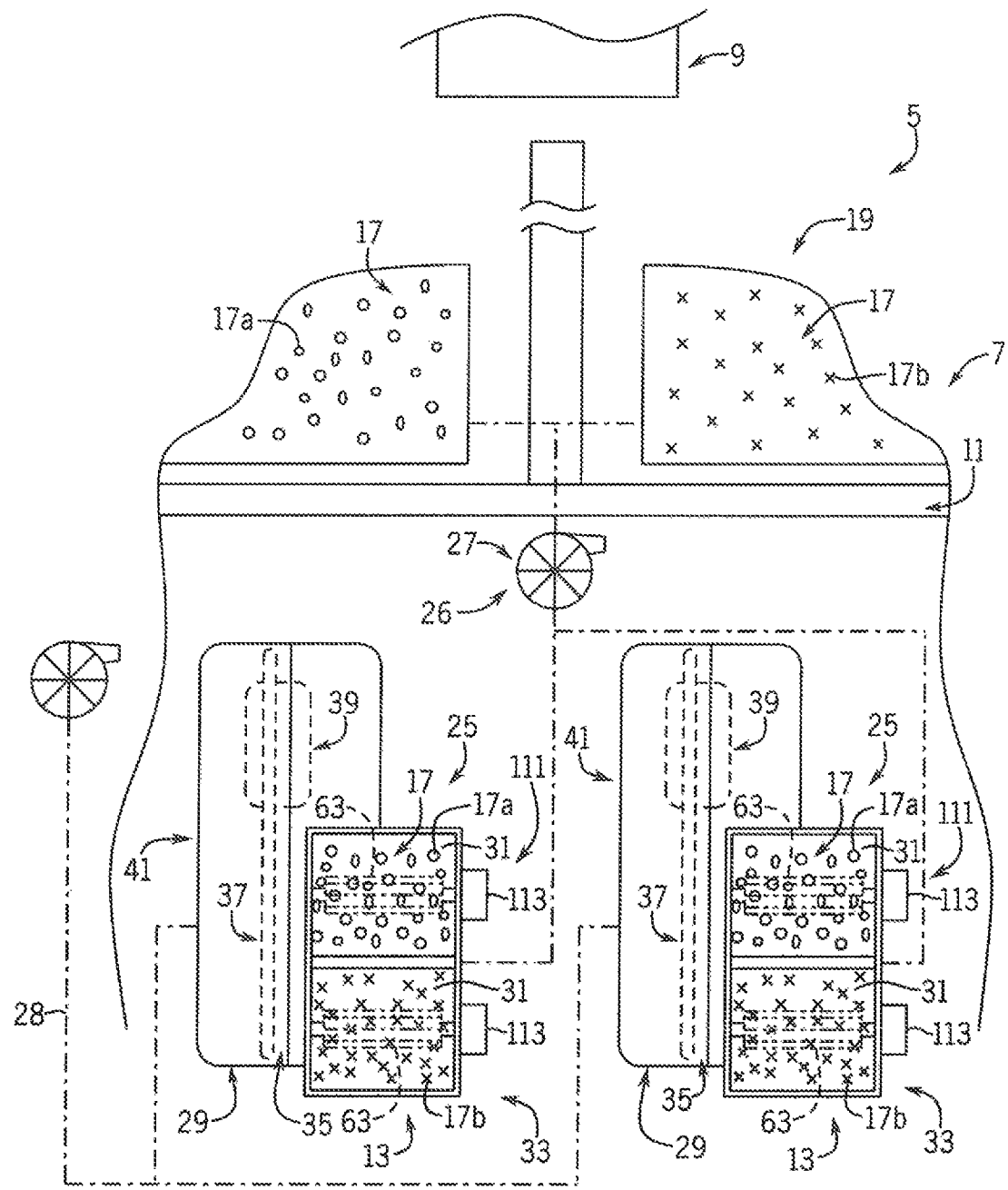
FIG. 2 is a simplified schematic representation of a portion of the planter of FIG. 1.
Figure 3:
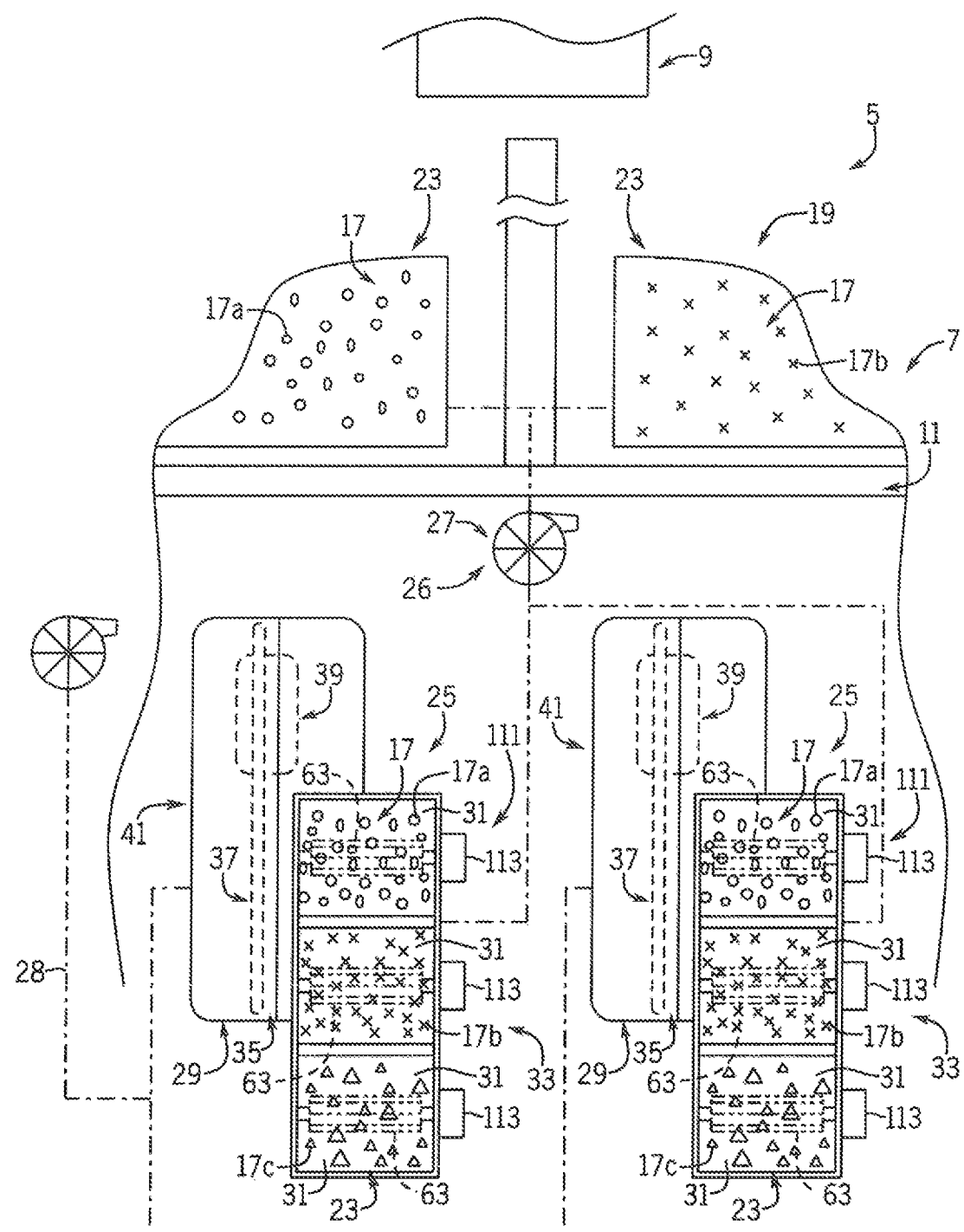
FIG. 3 is another simplified schematic representation of a variation of the portion of the planter shown in of FIG. 2.

Referring now to FIG. 2, planter 7 includes airflow system 26 that provides pneumatic power for use by various components of the planter 7 by way of, for example, positive air pressure source(s) and vacuum source(s) for establishing positive and/or vacuum pressures and corresponding airflows, depending on the particular configurations of the pneumatic system(s) in which they are incorporated. The positive air pressure source(s) and vacuum source(s) can be known pumps, fans, blowers, and/or other known airflow system components. Airflow system 26 includes a seed conveyance airflow system 27 and a seed meter airflow system 28. When bulk storage system 19 has central bulk storage capacity, seed conveyance airflow system 27 pneumatically delivers seeds of the different types 17a, 17b from the bulk storage system 19 into an on-row seed storage system represented as on-row storage system 25. Seed conveyance airflow system 27 delivers the seed 17 in an airflow that entrains the seed 17 and flows along a flow path defined by, for example, conduits that extend along the planter 7 to the row units 13 to be dropped into the seed trench formed by the furrow opening mechanism. Seed meter airflow system 28 provides negative and/or positive pressure for operation of seed meters at the row units 13, explained in greater detail elsewhere herein. As shown in FIG. 2, on-row storage system 25 can locally store relatively small amounts of seeds 17 at each of multiple row units 13 to feed a seed-metering system 29 which can be configured to simultaneously plant different types 17a, 17b from the different row units 13, or otherwise switch seed types 17a, 17b being planted from a single row unit 13, as explained in greater detail elsewhere herein. The different seed types 17a, 17b sent from the bulk storage system 19 are stored in multiple compartments 31 of the on-row storage system 25 at each row unit 13. The compartments 31 of the on-row storage system 25 may be defined within an on-row hopper represented here as vented mini-hopper 33. Compartments 31 are shown here defined within an upper portion of mini-hopper 33, receiving seeds from the bulk storage system 19. Optionally, compartments 31 may include at least one on-row bulk tank, or other separate and distinct compartment(s) on the row unit 13. As an example of on-row bulk storage, FIG. 3 shows the on-row storage system 25 defining part of the bulk storage system 19 with manual-fill on-row bulk storage compartments 23 at the row units 13 that stores a third type of seed 17c. Although FIG. 2 shows two types 17a, 17b of seed and FIG. 3 shows three types 17a, 17b, 17c of seed, it is understood that the planting system 5 may be configured to deliver more than three types of seed. For ease of explanation, planting system 5 is primarily described with respect to two types 17a, 17b, of seed. These explanations are equally applicable to more than two types of seed, such as by scaling for additional seed types and with corresponding increased number of components.

Referring now to FIGS. 2 and 3, the compartments 31 of the on-row storage system 25 feed the seed types 17a, 17b, 17c (FIG. 3) to seed meter 35 of the seed-metering system 29. Each seed meter 35 can be a purely mechanical-type seed meter 35 or a pneumatic seed meter 35. Seed disk 37 is rotated to move at least a surface of the seed disk through a seed pool inside of the seed meter 35 that is exposed to the seed disk 37 to pick up and singulate seeds using seed pockets or fingers from the seed pool. The individual seeds are conveyed through the seed meter 35 for individual release out of the seed meter 35 through seed delivery system 39, which may include a seed tube, a seed delivery belt, or other seed delivery mechanism, toward a seed trench of the agricultural field. Rotation of seed disk 37 is accomplished by way of a seed disk drive system. The seed disk drive system may include, for example, various electric or hydraulic motors, drive shafts, chains and belts, clutches, peg and hole drive systems, and/or other arrangements such as a directly driven arrangement in which a motor directly drives the seed disk at its hub or periphery. Pneumatic seed meters 35 of negative pressure types are further operably connected through a vacuum inlet 43 (FIG. 4) to the seed meter airflow system 28 of airflow system 26 to provide a vacuum airflow within a vacuum chamber establishing a negative or vacuum pressure within the seed meter 35 opposite the seed pool allowing the seeds 17 to be held against the seed disk 37, such as within the seed pockets by the vacuum pressure. Pneumatic seed meters 35 of positive pressure types are operably connected through a pressurized air inlet (not shown) to the seed meter airflow system to provide a positive airflow and a corresponding positive pressure at the seed side of the seed disk within the seed meter 35, whereby seeds from the seed pool are pushed and held against the seed disk, such as within the seed pockets, by positive pressure.

Figure 4:
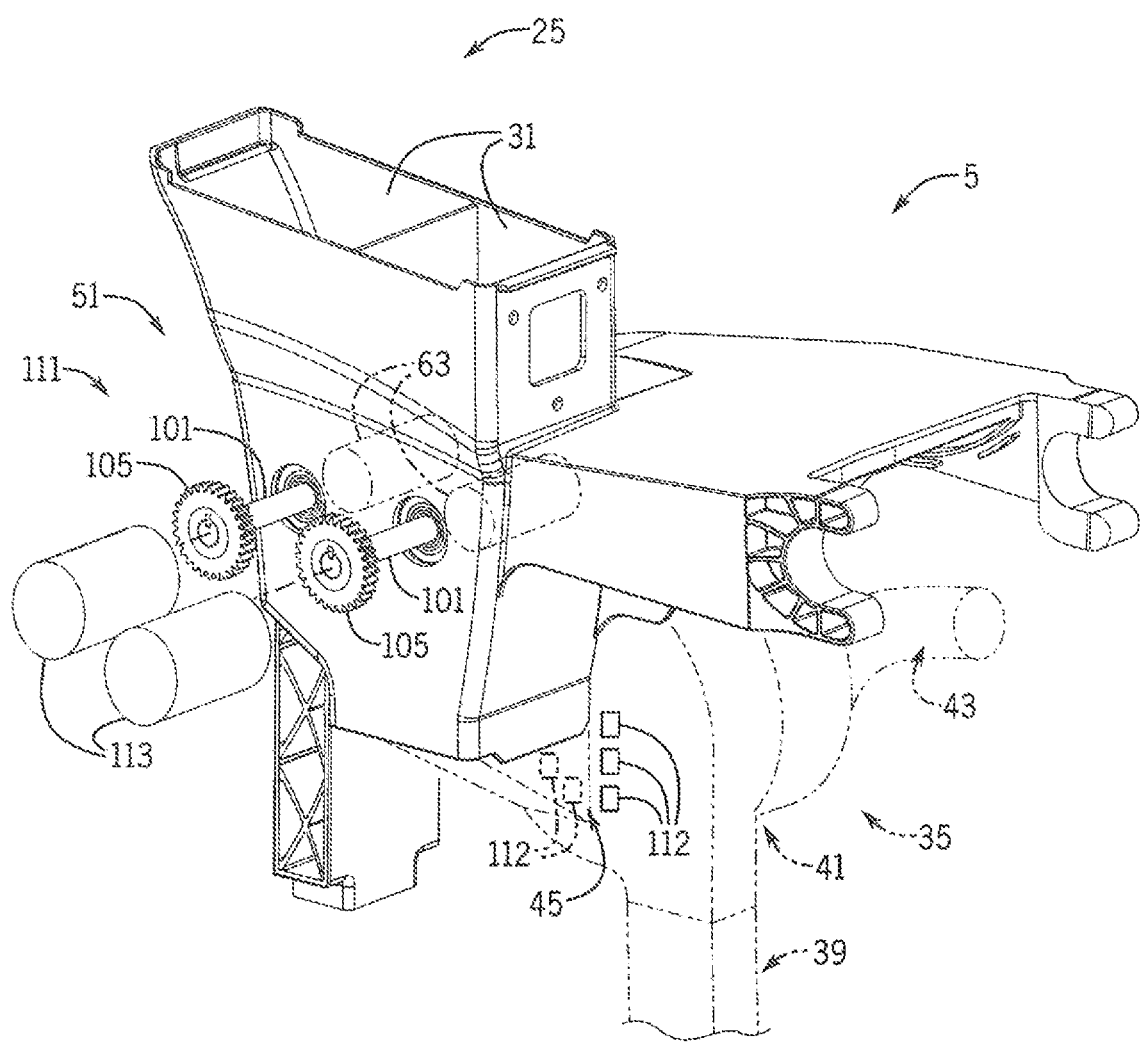
FIG. 4 is an isometric view of a portion of a row unit of the planter of FIG. 1

Still referring to FIGS. 2 and 3, seed meter 35 includes a housing 41 with first and second side portions or left and right covers that connect to each other at their peripheries to define an enclosure to collectively surround a housing cavity in which seed disk 37 is at least partially arranged for rotation. Although seed disk 37 is shown in FIGS. 2 and 3 as entirely enclosed within housing 41 and its housing cavity, it is understood that at least a portion of seed disk 37 may extend out of the housing 41 and its housing cavity. Other components may be arranged within the housing cavity, such as various seals that engage seed disk 37 to provide vacuum shut-off or positive pressure isolation and a seed singulator that is configured to inhibit more than one seed from being discharged from the seed meter 35 per seed discharge event. A brush assembly may be arranged within the housing cavity to provide a barrier that retains the seed 17 inside the housing cavity instead of, for example, spilling out of the meter through the seed delivery system 39. Referring now to FIG. 4, seed meter 35 is shown here as a vacuum meter with vacuum inlet 43 at one side or meter cover that is connected to a vacuum hose that applies vacuum pressure from a vacuum pump or other vacuum source of seed meter airflow system 28 (FIG. 2) to pull seeds 17 into the seed pockets of seed disk 37 (FIGS. 2 and 3). Seed inlet 45 is provided at the side or meter cover and defines a passage that receives seeds 17 from on-row storage system 25 that are selectively delivered from a system for feeding different types of seed into the seed meter, shown here as pre-metering system 51.

Figure 5:
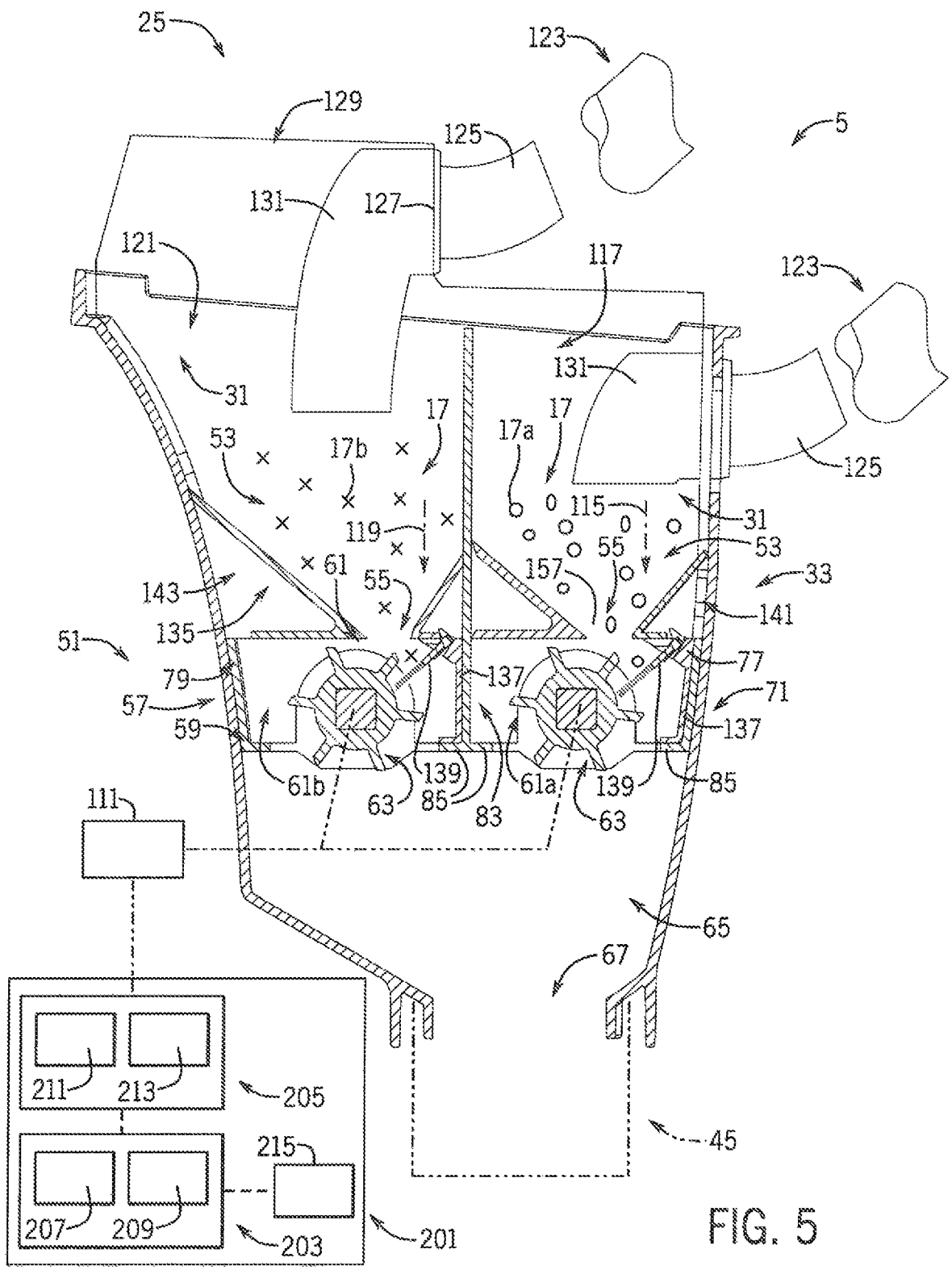
FIG. 5 is a cross-sectional side elevation view of a portion of a row unit of the planter of FIG. 1.
Figure 6:
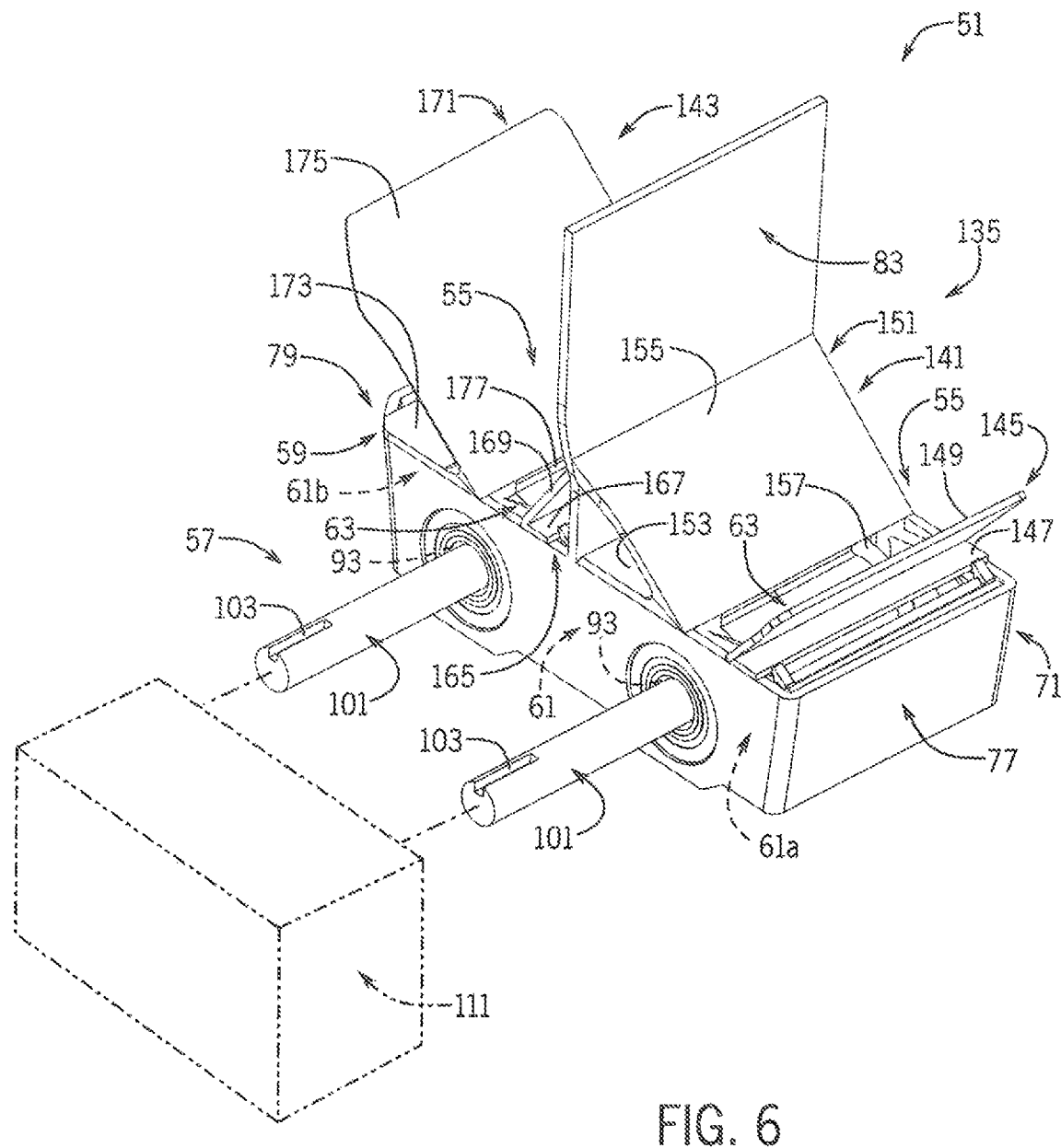
FIG. 6 is an isometric view of portions of the pre-metering system of FIG. 5.

Referring now to FIG. 5, pre-metering system 51 includes compartment outlet segments 53 defined in lower portions of the compartments 31 with compartment outlets 55 that are sloped or funnel-shaped to direct seed from the compartments 31 toward feeder wheel arrangement 57. Referring now to FIGS. 5-6, feeder wheel arrangement 57 includes feeder wheel carrier 59 that defines a carrier cavity 61 that is arranged to receive seeds 17 from the compartment outlets 55 and house multiple feeder wheels 63 that are rotated for delivering seeds 17 through and out of the carrier cavity 61. The carrier cavity 61 has multiple cavity segments in which multiple feeder wheels 63 are arranged, shown here with a front carrier cavity segment 61a that houses a front feeder wheel 63 and a back carrier cavity segment 61b that houses a back feeder wheel 63. Referring again to FIG. 5, seeds 17 delivered through carrier cavity 61 by feeder wheel(s) 63 are released into and through hopper outlet 67, shown here defined within a lower portion of mini-hopper 33, that is connected to the seed inlet 45 of seed meter 35 (FIG. 4).

Figure 7:
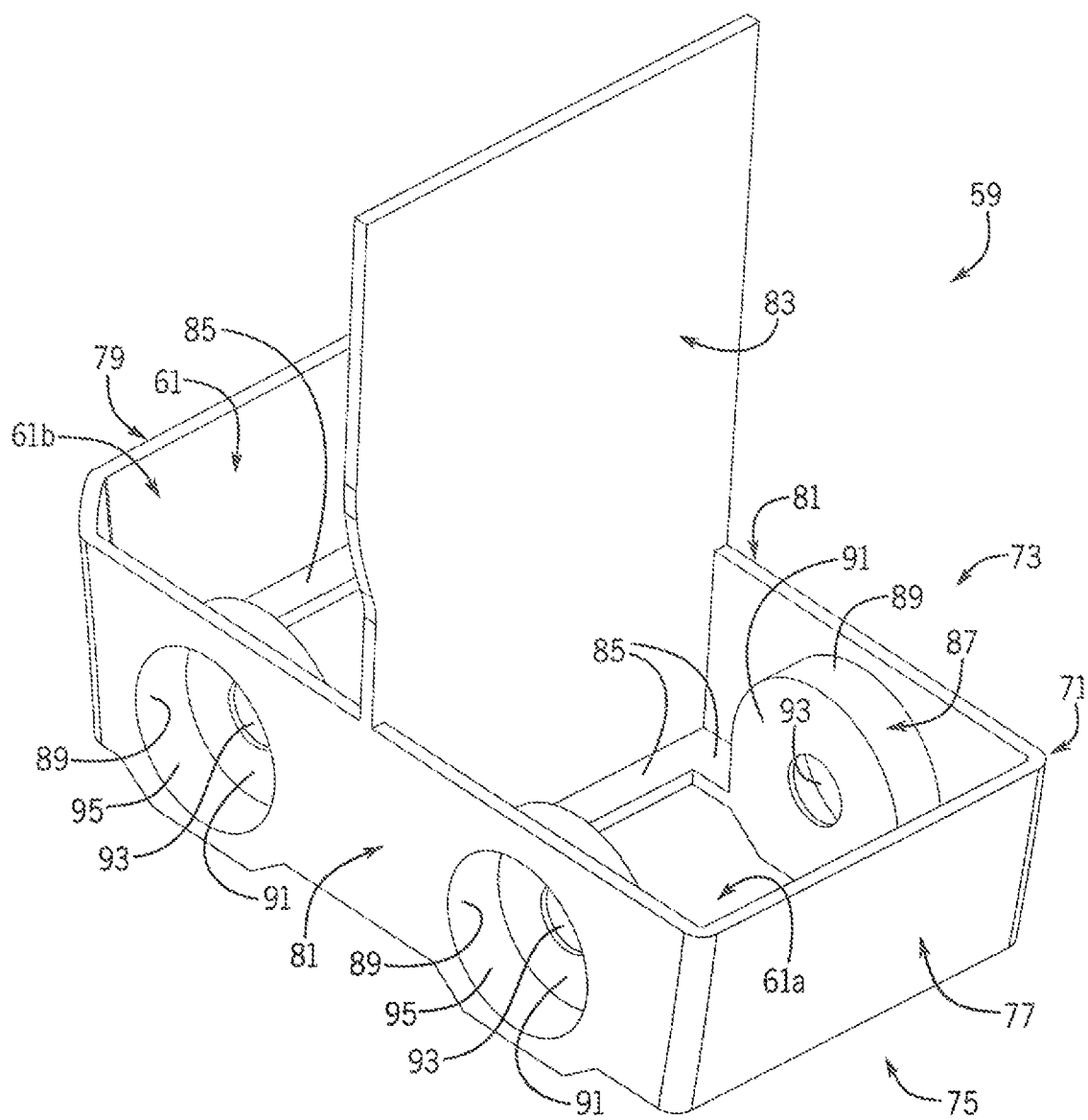
FIG. 7 is an isometric view of a feeder wheel carrier of the pre-metering system of FIG. 6.

Referring now to FIG. 7, feeder wheel carrier 59 defines a main carrier body 71 with a generally box-like form having an open top and bottom ends 73, 75. A generally rectangular perimeter of carrier body 71 has front and back walls 77, 79 at respective front and back ends of carrier body 71. A pair of side walls 81 connects the front and back walls 77, 79 to each other. Divider wall 83 provides a barrier between the front and back carrier cavity segments 61a, 61b and extends perpendicularly between sidewalls 81, generally parallel to front and back walls 77, 79, and upwardly beyond upper edges of the front, back, and sidewalls 77, 79, 81. Ledges 85 extend inwardly from lower edges of the front, back, and sidewalls 77, 79, 81. Feeder wheel supports 87 are defined at the sidewalls 81. Each feeder wheel support 87 is shown as a hollow puck with circumferential side wall 89 that extends inwardly from sidewall 81 into the carrier cavity 61 and an annular end wall 91. Bore 93 extends through the end wall 91, and counterbore 95 extends inwardly into feeder wheel support 87 from an outside surface of sidewalls 81. Bores 93 of the feeder wheel supports 87 on opposite side walls 81 are aligned with each other.

Referring again to FIG. 6, bores 93 receive shafts 101 (FIG. 6) that support and drive feeder wheels 63 (FIG. 6) by way of, for example, splined, keyed, or square cross-sectional mounting (FIG. 5) of the feeder wheels 63 onto shaft 101 to lock feeder wheels 63 into rotational unison with shaft 101. Outer ends of shaft 101 are shown with keyways 103 for connecting shaft 101 to drive gears 105 (FIG. 4). Pre-metering drive system 111 individually rotates shafts 101 and feeder wheels 63 to selectively deliver one of the seed types 17a, 17b (FIG. 5) into the seed meter 35 (FIG. 5) at a given time. Referring again to FIG. 4, pre-metering drive system 111 is shown with multiple drive motors 113, with each motor 113 having an output shaft and gear (not shown) and engages a gear 105 to drive rotation of a respective shaft 101 and feeder wheel 63. Motors 113 may directly drive feeder wheels 63, such as those shown in FIGS. 2 and 3. It is understood that multiple feeder wheels 63 could be driven using a single motor 13 and gears, belts, chains, or other power transmission components that connect the motor 13 to clutches (not shown) that drive the feeder wheels 63 so that engaging and disengaging the clutches drives and holds stationary the respective feeder wheels 63. Pre-metering drive system 111 controls rotation of feeder wheels 63 to control seed flow into the seed meter 35. Referring now to FIG. 4, at least one seed sensor, shown here as multiple seed sensors 112, are arranged in the seed meter 35 to provide a signal that indicates a level of seed in the seed meter 35, which is used by the pre-metering drive system 111 in controlling rotation of the feeder wheels 63 based on whether a currently planted seed type is being further planted or whether the planted seed type will be changed, as explained in greater detail elsewhere herein.

Referring again to FIG. 5, each feeder wheels 63 receives and delivers seeds through the on-row storage system 25 and toward the hopper outlet segment 65 and seed inlet 45 along a discrete path, shown as front delivery path 115 of a front hopper section 117 in which a forward compartment 31 is arranged and back delivery path 119 of a back hopper section 121 in which a rearward compartment 31 is arranged, longitudinally aligned behind the forward compartment 31. Front and back hopper sections 117, 121 are shown receiving seeds 17 from remote bulk storage of bulk storage system 19 (FIGS. 2-3) through conduits such as seed delivery hose 123 that connects to coupling elbows 125. A front coupling elbow 125 is shown extending through a front wall of mini-hopper 33, and a back coupling elbow 125 is shown extending through an upright stepped wall 127 of lid 129 of mini-hopper 33. Seed deceleration elbows 131 may be provided inside the compartments 31 of the front and back hopper sections 117, 121, connected to the coupling elbows 125 for slowing the travel speed of seeds 17 and allowing the seeds 17 to drop downwardly into the compartments 31. Once in the compartments 31, seeds 17 are guided through the compartment outlet segments 53 along the front and back delivery path 115, 119 by various sloped surfaces of components that, together with feeder wheel carrier 59, collectively define a hopper insert 135.

Referring again to FIGS. 5-6, feeder wheel carrier 59 provides support or mounting structure against which various other components of hopper insert 135 are mounted. As shown in FIG. 5, ledges 85 extend from front wall 77 and divider wall 83 of feeder wheel carrier 59 support brush holders 137 that hold brush strips 139. Brush strips 139 retain seed 17 inside carrier cavity 61 instead of, for example, spilling out of the compartments 31, past the feeder wheels 63 and into the hopper outlet segment 65 and seed inlet 45. Referring again to FIGS. 5-6, toward the front and the back of hopper insert 135, sloped surfaces provide ramps such as front and back ramped arrangements 141, 143 that funnel that seed 17 (FIG. 5) toward the respective feeder wheel 63.

Referring again to FIG. 6, toward the front of hopper insert 135, front ramped arrangement 141 has a front ramped cover 145 with bottom wall 147 that covers a portion of the open top of main carrier body 71 and extends over a front portion of the front feeder wheel 63. Sloped wall 149 extends angularly upward and forward from a back edge of the bottom wall 147, with an upper edge of sloped wall 149 engaging a surface of the front wall of mini-hopper 33 (FIG. 5). A rear ramped cover 151 of front ramped arrangement 141 includes bottom wall 153 that covers a portion of the open top of main carrier body 71 and extends over a back portion of the front feeder wheel 63. Sloped wall 155 extends angularly upward and back from a forward edge of the bottom wall 153, with an upper edge of sloped wall 155 engaging a surface of divider wall 83. The space between the front and rear ramped covers 145, 151, defines a slot 157 through which seed 17 can flow from compartment outlets 55 into the front carrier cavity segment 61a. Toward the back of hopper insert 135, back ramped arrangement 143 has a front ramped cover 165 with bottom wall 167 that covers a portion of the open top of main carrier body 71 and extends over a front portion of the back feeder wheel 63. Sloped wall 169 extends angularly upward and forward from a back edge of the bottom wall 167, with an upper edge of sloped wall 169 engaging a surface of divider wall 83. A rear ramped cover 171 of back ramped arrangement 143 includes bottom wall 173 that covers a portion of the open top of main carrier body 71 and extends over a back portion of the back feeder wheel 63. Sloped wall 177 extends angularly upward and back from a forward edge of the bottom wall 173, with an upper edge of sloped wall 175 engaging a surface of the back wall of mini-hopper 33 (FIG. 5). The space between the front and rear ramped covers 165, 171, defines a slot 177 through which seed 17 can flow from compartment outlets 55 into the rear carrier cavity segment 61b.

Referring again to FIG. 5, pre-metering drive system 111 and other components of planting system 5 are controlled by control system 201 to plant multiple types or varieties of seed 17 and automatically and rapidly switch between the types or varieties during planting in a single planting pass by controlling pre-metering drive system 111 to selectively drive rotation of feeder wheels 63, which may include incrementally dosing or charging the seed meter 35 in discrete charging phases to correspond to the seed type that is and/or will be planted.

Figure 10:
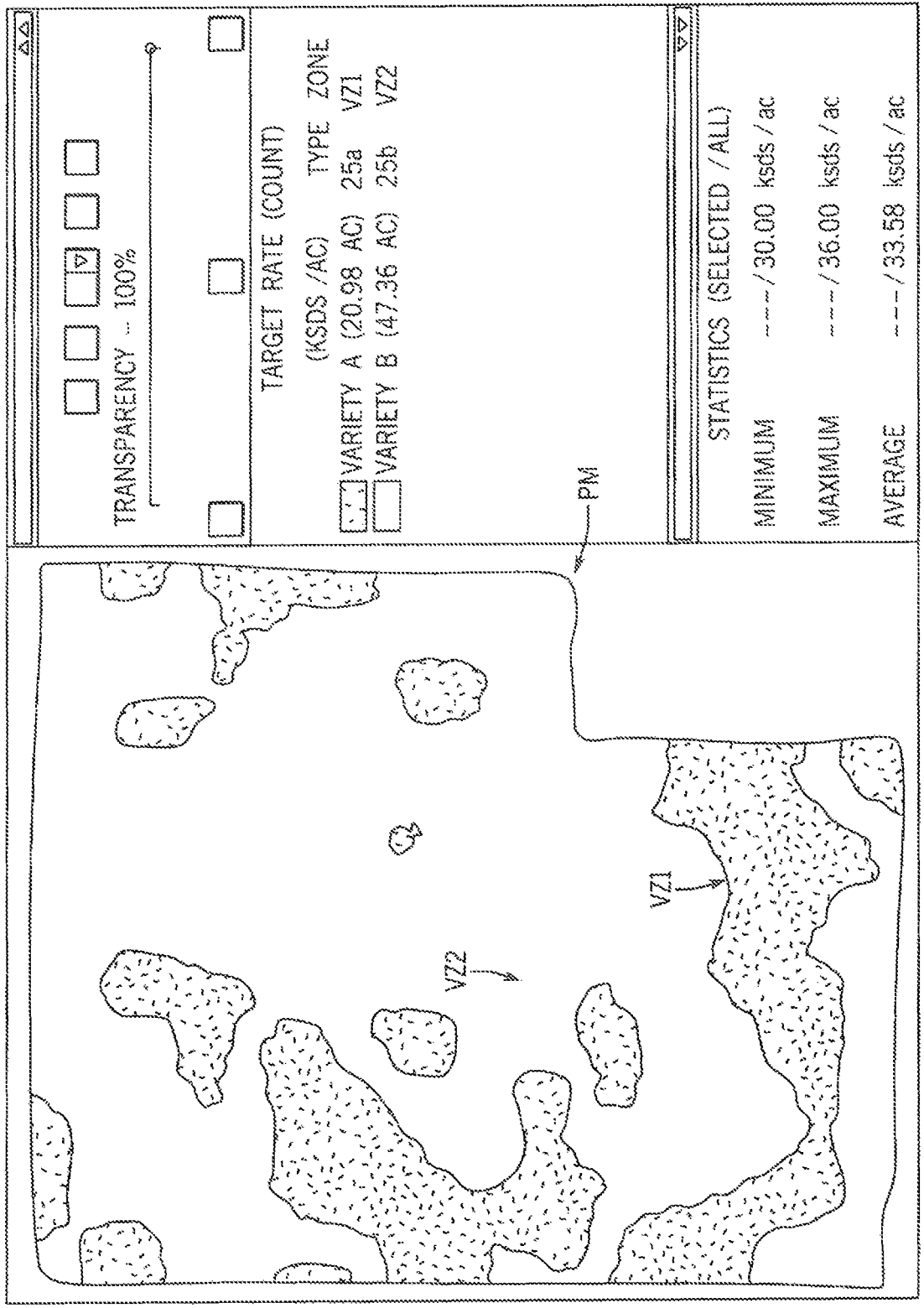
FIG. 10 is an example of a seed variety prescription map for use with the pre-metering system.

Still referring to FIG. 5, control system 201 includes tractor control system 203 and planter control system 205 that operably communicate with each other, for example, by way of an ISOBUS connection, for coordinating controls of tractor 9 (FIG. 1) and planter 7, including which seed type(s) 17a, 17b are delivered, based on the type or variety zones VZ1, VZ2 of the agricultural field. Variety zones VZ1, VZ2 may correspond to a seed type or variety prescription map PM as shown in FIG. 10. In FIG. 5, tractor control system 203 is shown having a tractor controller 207 and power supply 209, and planter control system 205 is shown having a planter controller 211 and power supply 213. Each of the tractor and planter controllers 207, 211 can include an industrial computer or, e.g., a programmable logic controller (PLC), along with corresponding software and suitable memory for storing such software and hardware including interconnecting conductors for power and signal transmission for controlling respective electronic, electro-mechanical, hydraulic, and pneumatic components of the tractor 9 and planter 7. Tractor controller 207 is configured for controlling the functions of the tractor 9 by controlling, e.g., steering, speed, braking, shifting, and other operations of the tractor, which may include controlling various GPS steering or other GPS-related systems, transmission, engine, hydraulic, and/or other systems of the tractor 9. A tractor interface system 215 is operably connected to the tractor control system 203 and includes a monitor and various input devices to allow an operator to see the statuses and to control various operations of the tractor 9 from within the cab of the tractor 9. The tractor interface system 215 may be a MultiControl Armrest™ console available for use with the Maxxum™ series tractors from Case IH.

Still referring to FIG. 5, planter control system 205 is configured for controlling the functions of planter 7 (FIGS. 2-3) by controlling, e.g., product conveyance along the planter 7 (FIGS. 2-3), seed 17 delivery selection, and seed delivery out of planter 7 to the field. This may include controlling the positive pressure blowers and vacuum pumps and/or other vacuum sources, as well as fans, blowers, of seed conveyance and seed meter airflow systems 27, 28 (FIGS. 2-3), as well as controlling other characteristics of seed meter 35 such as adjusting singulator and baffle settings by way of controlling corresponding solenoids, stepper motors, or the like. Planter control system 205 also controls pre-metering drive system 111, which corresponding controls pre-metering system 51, such as by controlling rotation of feeder wheels 63, based on the type or variety zones VZ1, VZ2, such as by the prescription map PM (FIG. 10).

Referring now to FIGS. 5 and 10, during use of planting system 5, control system 201 can determine planter position, speed, heading, and/or other movement characteristics by way of monitoring tractor position and movement through the tractor controller 207. Tractor controller 207 may evaluate, for example, a speed input signal from a tractor speed sensor along with a GPS signal or data from tractor GPS with respect to the prescription map PM (FIG. 10). Referring again to FIG. 5, using such evaluations, control system 201 determines which row units 13 should plant which seed type(s) 17a, 17b and when, to achieve such multi-seed type planting. The planter controller 211 commands pre-metering drive system 111 to selectively drive rotation or stop rotation of the feeder wheels 63 to achieve multi-seed-type planting according to the prescription map PM (FIG. 10).

Figure 8:
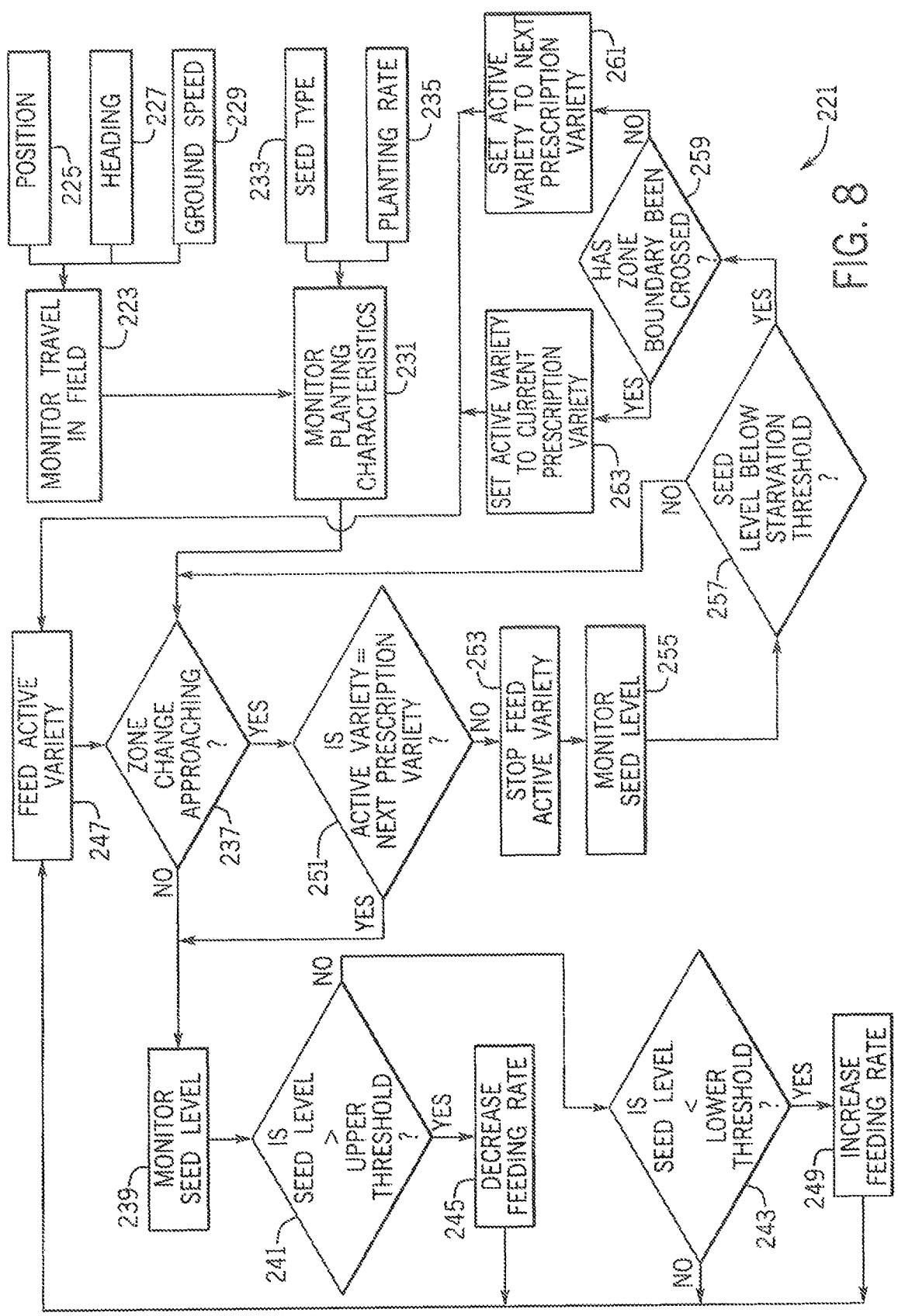
FIG. 8 is a flowchart showing a method of continuous feeding of using the pre-metering system.

Referring now to FIGS. 5, 8, and 10, FIG. 8 shows an exemplary method 221 that control system 201 (FIG. 5) may use to control planting system 5 (FIG. 5) according to prescription map PM (FIG. 10). As an initial step represented in block 223, control system 201 monitors travel characteristics of planter 7 (FIG. 1) and/or tractor 9 (FIG. 1) in the field. This may include monitoring position, heading, and ground speed, as shown in blocks 225, 227, 229. For example, control system 201 may input signals or other information from various systems and components of planter 7 and/or tractor 9 such as GPS unit(s) and speed sensors related to position, heading, and ground speed at blocks 225, 227, and 229 to determine and monitor the field travel characteristics such as where the planter 7 and/or tractor 9 is positioned in the field, which direction it is facing, and its travel speed. Control system 201 also monitors planting characteristics, as represented in block 231. This may include monitoring seed type 17a, 17b, such as which type of seed 17 is currently being planted, and which type(s) of seed 17 are stored in different compartments of the bulk storage and/or on row storage systems 19, 25 (FIGS. 2-3), as well as planting rates, as represented in blocks 233, 235. Block 237 represents the control system 201 evaluating whether a change in zone type or variety zone VZ1, VZ2 (FIG. 9) is approaching, which may correspond to a zone boundary that is within a predetermined distance and/or estimated time to cross the zone boundary into a next variety zone VZ1, VZ2. If there is no approaching zone change, the control system 201 continues to monitor seed level within the seed meter 35, which may be based on, for example, signals from seed sensors 112 (FIG. 4), at block 239. This may include comparing the signals or other information from seed sensors 112 (FIG. 4) and therefore a current seed level value with a seed level threshold value(s) that is saved in or determined by control system 201. The seed level threshold value(s) may include a range of acceptable seed level values defined between a lower seed level threshold value and an upper seed level threshold value. As represented at blocks 241 and 243, control system 201 makes a feeding rate decision based on the comparison of the current seed level value to the upper and lower seed level threshold values. At block 241, if the current seed level value is greater than the upper seed level threshold value, then control system 201 decreases the feeding rate, as represented in block 245. This may be done by controlling pre-metering drive system 111 to command a slower rotation of the feeder wheel 63 (block 245) that feeds the active seed type or variety to seed meter 35 at block 247, with the active variety being the variety that is currently being fed by the pre-metering system 51 (FIG. 5). At block 241, if the current seed level value is not greater than the upper seed level threshold value, then control system 201 compares the current seed level value to the lower seed level threshold value at block 243. At block 243, if the current seed level value is not less than the lower seed level threshold value, then no change is made to the feeding rate so that control system 201 maintains the current feeding rate while feeding of the active seed variety at block 247. At block 243, if the current seed level value is less than the lower seed level threshold value, then control system 201 increases the feeding rate, as represented in block 249. This may be done by controlling pre-metering drive system 111 to command a faster rotation of the feeder wheel 63 (block 249) that feeds the active seed type to seed meter 35 at block 247.

Still referring to FIG. 8 with additional reference to FIGS. 5 and 10, if at block 237 the control system 201 determines that there is an approaching zone change, then the control system 201 evaluates whether to command a seed switchover procedure. As represented at block 251, control system 201 compares an active variety to the next prescription variety, with the next prescription variety being the prescription for the next upcoming variety zone. If the active variety is the same as the next prescription variety, then control system 201 continues to monitor seed level at block 239. If at block 251 control system 201 determines that the active variety is not the same as the next prescription variety, then feeding the active seed type is stopped at block 253. This may be done by control system 201 controlling pre-metering drive system 111 to stop the rotation of the feeder wheel 63 that feeds the active seed type to seed meter 35, and may include holding all of the feeder wheels 63 in a stopped condition to reduce the amount of seed in the seed pool. As represented at block 255, control system 201 monitors seed level within the seed meter 35, like at block 239. Control system 201 determines whether the seed level is low at block 255. The low seed level determination at block 257 may be similar to that at block 243 by using the same seed lower level threshold value used in the comparison for the feeding rating control at block 243, or control system 201 may use a different value. When control system 201 uses a different value at block 257, the different value may correspond to a changeover low seed level value that may correspond to a smaller seed pool or a relatively more starved condition of the seed meter 35 compared to what is required to trigger an increased feeding rate at block 249. This is represented as a determination of whether the seed level is below a starvation threshold value at block 257. Regardless, at block 257, if the seed level is not low, then control system 201 continues to monitor whether a zone boundary is approaching at block 237. If the seed level is low, such as below the starvation threshold, then control system 201 evaluates whether the variety boundary has been crossed, as represented at block 259. If the variety boundary has not been crossed, then control system 201 sets the active variety to the next prescription variety of the next prescription variety zone VZ1, VZ2 (FIG. 10) at block 261. Then control system 201 controls pre-metering drive system 111 to start rotating the feeder wheel 63 that feeds the (new) active seed type to feed seeds that correspond to the next prescription variety zone to seed meter 35 as the active variety at block 247. If at block 259 control system 201 determines that the variety boundary has been crossed, the control system 201 sets the active variety of seeds to the current prescription variety in which the planter is positioned at that time, with the current prescription variety being the prescription for the variety zone that the machine is currently located in, as represented at block 263. Then control system 201 continues to feed the active variety at block 247.

Figure 9:
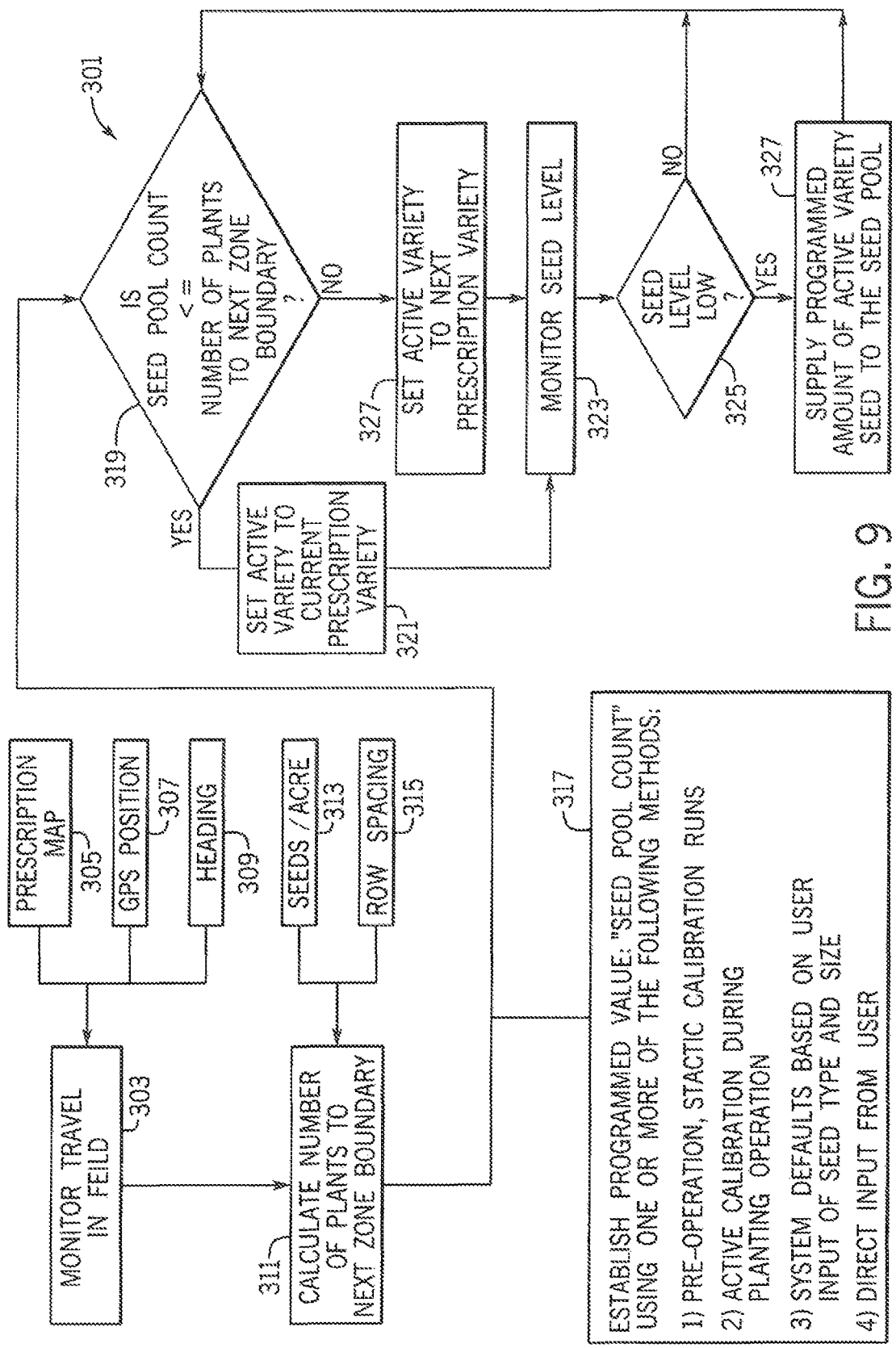
FIG. 9 is a flowchart showing a method of incremental feeding using the pre-metering system.

Referring now to FIGS. 5, 9, and 10, FIG. 9 shows another exemplary method 301 that control system 201 (FIG. 5) may use to control planting system 5 (FIG. 5) according to prescription map PM (FIG. 10). Method 301 represents an example of an incremental feeding methodology. Control system 201 monitors travel in the field as represented at block 303. This may include evaluating information from various systems of planter 7 and/or tractor 9 related to prescription map PM, GPS position, and heading, as represented at blocks 305, 307, and 309 to determine the field travel characteristics. Control system 201 may calculate the number of plants until the next zone boundary, as represented at block 311. This may include an evaluation of planting density such as seeds/feet and/or seeds/acre as shown in block 313 along with in-row seed spacing or row spacing distances as shown in block 315 with respect to the monitored field travel information such as distance to the next variety zone VZ1, VZ2 (FIG. 10). As represented at block 317, a programmed value of a seed pool count is established. This may be done in a variety of ways. Pre-operation static calibration runs may be performed to establish program values of seed pool count, which is then stored by control system 201, or control system 201 may actively calibrate to establish the programmed value of seed pool count during the planting operation. Control system 201 may use system defaults for the program values of seed pool count based on user input of seed type and size, which may be stored in, for example, lookup tables or other data storage arrangements. Optionally, the program values for seed pool count can be directly inputted for use by control system 201 by the user or provided by third party seed information providers. Regardless, control system 201 compares the seed pool count to the number of plants until the next time boundary as represented at block 319. If at block 319 control system 201 determines that the seed pool count is less than or equal to the number of plants to the next boundary, then control system 201 sets the active variety to the current prescription variety as represented at block 321. Control system 201 monitors seed level in seed meter 35, as represented at block 323, for example, by evaluating signals or other information from seed sensors 112 (FIG. 4). At block 325, if the control system 201 determines that seed level is low, such as below a threshold value, then a programmed amount of the active variety of seed is fed to seed meter 35 at block 327. The programmed amount may correspond to a known volume such as a volume of a full or partially full seed pool of the seed meter 35 or may correspond to a number of rotations of feeder wheel 63 to deliver a particular amount of seed. At block 325, if the control system 201 determines that seed level is not low, then another comparison of the seed pool count is made to the number of plants to the next boundary at block 319. If the comparison at block 319 shows that the seed pool count is not less than or equal to the number of plants to the next boundary, the control system 201 sets the active variety to the next prescription variety at block 329. Then control system 201 continues to monitor seed level and evaluate whether seed level is low at blocks 323, 325. When the seed level is low, a preprogrammed amount of the (new) current seed type is fed to seed meter 35 by control system 201 by controlling pre-metering drive system 111 to command rotation of the corresponding feeder wheel 63 at block 327.

Many changes and modifications could be made to the invention without departing from the spirit thereof. Various components and features of the system 5, for example, components or features of the seed storage system(s), charging system(s), and seed metering system(s) can be incorporated alone or in different combinations on a planter. The scope of these changes will become apparent from the appended claims.

We claim:

1. A pre-metering system for a multi-variety planter for planting multiple types of seed in a single planting pass during row-crop planting of an agricultural field, the multi-variety planter including a plurality of row-units supported by a frame configured to move over the agricultural field, and a seed meter carried by each of the plurality of row-units, the pre-metering system feeding different types of seed into each seed meter of each row-unit of the plurality of row-units for planting the agricultural field, the pre-metering system comprising:
   a feeder wheel carrier arranged between multiple compartments of an on-row seed storage system that includes multiple compartments arranged at each of the plurality of row-units for separately storing multiple types of seed in multiple compartments at each row-unit, and a single outlet, each seed meter at each row-unit configured to singulate seed for delivery onto an agricultural field, each seed meter having a housing with a single, seed inlet for directing seeds into the seed meter; and
   multiple feeder wheels supported by the feeder wheel carrier, with each one of the multiple feeder wheels arranged to receive seed from a respective one of the multiple compartments and selectively deliver the seed through the outlet to a seed meter inlet of the seed meter housing.

2. The pre-metering system of claim 1, wherein at least one seed sensor is arranged at the seed meter for detecting a seed condition within the seed meter and wherein the multiple feeder wheels are selectively rotated to feed one of the multiple types of seed to the seed meter based on the detected seed condition within the seed meter.

3. The pre-metering system of claim 2, wherein which one of the multiple feeder wheels is rotated is based on a determination of an approaching zone change in which a different one of the multiple types of seed is to be planted.

4. The pre-metering system of claim 3, wherein the determination of the approaching zone change is based on an evaluation of a planting rate value, a ground speed value, and a position of the planter and/or tractor in the agricultural field.

5. The pre-metering system of claim 3, wherein the determination of the approaching zone change is based on an evaluation of a distance to an approaching zone that is different than a currently planted zone and a planting density value.

6. The pre-metering system of claim 1, wherein the feeder wheel carrier comprises a main carrier body with interconnected walls that extend around a carrier cavity and wherein the multiple feeder wheels are arranged within the carrier cavity.

7. The pre-metering system of claim 6, wherein the carrier cavity defines multiple carrier cavity segments that are separated from each other and wherein the multiple feeder wheels are respectively arranged in the multiple carrier cavity segments.

8. The pre-metering system of claim 1, wherein each of the compartments of the on-row seed storage system includes a compartment outlet with sloped surfaces that slope toward the feeder wheel carrier to funnel the seed toward the respective feeder wheel.

9. The pre-metering system of claim 8, wherein the sloped surfaces at each compartment outlet are defined by front and back ramped arrangements that each slopes downwardly toward the respective feeder wheel and wherein the front and back ramped arrangements are spaced from each other to define a slot that overlies the respective feeder wheel.

* * * * *